Patented Oct. 11, 1949

2,484,295

UNITED STATES PATENT OFFICE 2,484,295

N-SUBSTITUTED OXYACETAMIDE COMPOUNDS AND INSECT CONTROL COMPOSITIONS

Lowell B. Kilgore, Washington, D. C., assignor, by mesne assignments, to Lowell B. Kilgore and Helen Ford Kilgore, both of Washington, D. C.

No Drawing. Application April 27, 1945, Serial No. 590,721

13 Claims. (Cl. 167—30)

The invention described herein relates to new organic compounds, more particularly to a new class of N-substituted acetamides and specifically to N-substituted α-etherified acetamides and methods for their preparation. This application is a continuation-in-part of my co-pending application Serial No. 461,481, filed October 9, 1942, now Patent No. 2,426,885, issued September 2, 1947.

An object of the present invention is to provide new and useful compounds of the general formula:

$$R-O-CH_2CO-NHR'$$

wherein R is aralkyl, and R' is a hydrocarbon radical. A further object of this invention is to provide processes for the preparation of these new compounds. Still a further object of this invention is the preparation of new and useful chemicals which possess insect combating properties to a high degree. Other objects and advantages of the invention will hereinafter appear.

These objects may be accomplished by reacting an α-etherified acetic acid with a primary amine so as to eliminate a molecule of water as follows:

(1) $R-O-CH_2COOH + R'NH_2 \rightarrow$
$R-O-CH_2CO-NHR' + HOH$

The same objects may also be accomplished by reacting an amide-forming derivative of an α-etherified acetic acid, such as the acyl halide, acid anhydride, or the ester of a volatile alcohol with a primary amine. These methods of preparing my new N-substituted α-etherified acetamides are characterized by the following equations:

(2) $R-O-CH_2COOY + R'NH_2 \rightarrow$
$R-O-CH_2CO-NHR' + YOH$
(3) $R-O-CH_2COX + R'NH_2 \rightarrow$
$R-O-CH_2CO-NHR' + HX$ wherein Y is the hydrocarbon residue of a volatile alcohol and X is halogen.

Still another means which I have discovered of attaining the objects of this invention comprises reacting the proper N-substituted α-haloacetamide with the alkali oxide of the requisite alcohol as shown by the following equation:

(4) $R-O-Me + XCH_2CO-NHR' \rightarrow$
$R-O-CH_2CO-NHR' + MeX$ wherein Me represents an alkali metal and X is halogen. In the foregoing Equations 1, 2, 3 and 4, R and R' represent either the same or different organic radicals.

The various means of obtaining the objects of this invention will be more readily understood by the following showing of detailed examples which, however, do not limit the scope of the invention in any way.

EXAMPLE 1

*Preparation of N-isobutyl phenethoxyacetamide*

5.3 grams of thionyl chloride was added to a solution of 8 grams of phenethoxyacetic acid dissolved in 75 cc. of benzene. After refluxing for 2 hours, the excess thionyl chloride together with 25 cc. of benzene was distilled off. 3.2 grams of isobutyl amine were added to the phenethoxyacetyl chloride and the mixture refluxed for 7 hours. It was washed with dilute HCl and water and then distilled under reduced pressure. 8 grams of product boiling at 145–148° C./1 mm. were obtained.

EXAMPLE 2

*Preparation of N-benzyl benzoxyacetamide*

18 grams of methyl benzoxyacetate were refluxed with an excess of benzyl amine. During this refluxing the methanol of reaction was slowly distilled off. The reaction mixture was diluted with benzene, washed with dilute HCl, and then water, and fractionated under reduced pressure. 12 grams of N-benzyl benzoxyacetamide boiling at 100–103° C./1 mm. were obtained.

EXAMPLE 3

*Preparation of N-dodecyl benzoxyacetamide*

20 grams of methyl benzoxyacetate were refluxed with 18 grams of dodecyl amine. During this refluxing the methanol of reaction was slowly distilled off. The reaction mixture was diluted with benzene and fractionated under reduced pressure. 8 grams of N-dodecyl benzoxyacetamide boiling at 210–15°/2 mm. were obtained.

Other members of the new series of N-substituted α-etherified acetamides which I have prepared by the methods set out in detail in the aforedescribed examples are:

N-amyl benzoxyacetamide
N-allyl benzoxyacetamide
N-cyclohexyl benzoxyacetamide
N-phenyl phenethoxyacetamide I have discovered that the new N-substituted α-etherified acetamides of my invention, as a class, possess valuable insect toxicant and fugient properties. Furthermore the physical properties of these compounds; such as odor and color are such as to make them unobjectionable for human use.

Table I demonstrates the efficacy of representative members of this new series of organic compounds against the common house fly, Musca domestica. The test procedure used was the "Sandwich bait" method substantially as described in Soap, June 1939, p. 103 ff. A coating of molasses was applied to one side of a strip of blotting paper and dried to a hard glossy surface. The molasses was then covered with a strip of a special thin, porous paper which had previously been immersed in a 5 percent solution in alcohol of the compound to be tested and then dried until the alcohol had evaporated. The concentration of the test solutions was reduced to 5 percent because the repellency of certain members of the series was so prolonged that the flies were in danger of dying before completion of the test. For purposes of comparison one strip was treated only with solvent and dried. The strips prepared in this fashion were mounted on a board and introduced into a large cage containing more than 2000 hungry house flies. By making observations at frequent intervals the duration of repellency, that is the length of time which elapsed before the flies began to feed on the molasses through the treated tissue was determined.

*Table I*

| Compound | Duration of Repellency |
| --- | --- |
| N-Amyl benzoxyacetamide | 2 hr. 15 min. |
| N-Dodecyl benzoxyacetamide | 5 hr. 40 min. |
| N-Isobutyl phenethoxyacetamide | 4 hr. 30 min. |
| N-Phenyl phenethoxyacetamide | 1 hr. |

Not only do the compounds of my invention possess especially marked repellency to house flies, but they are also very effective against other annoying pests such as the blackfly, mosquito, flea, red bug, gnat, and moth.

EXAMPLE 4

When applied to the forearm of an individual exposed to hungry Aedes aegypti mosquitoes, N-isobutyl phenethoxyacetamide repelled the insects for an average of 221 minutes.

EXAMPLE 5

Cloth impregnated with a solution comprising 1 gram of N-dodecyl benzoxyacetamide dissolved in 10 cc. of chloroform repelled hungry Aedes aegypti mosquitoes for 11 days.

Moreover I have discovered that these new N-substituted α-etherified acetamides possess contact insecticidal properties. This was demonstrated by means of the Peet-Grady bio-assay technique using house flies.

EXAMPLE 6

(a) A 5 percent solution of N-amyl benzoxyacetamide in deodorized kerosene gives a 100 percent knockdown in 10 minutes and a 61 percent kill after 24 hours by the Peet-Grady method against house flies.

(b) A 5 percent solution of N-allyl benzoxyacetamide in deodorized kerosene gives a 96 percent knockdown in 10 minutes and a 30 percent kill after 24 hours by the Peet-Grady method against house flies.

These new N-substituted α-etherified acetamides may be employed by direct topical application or they may be incorporated into liquid or solid carriers. They are especially useful as the active ingredients of insect-repellent lotions, creams, ointments and the like. They may be dissolved in liquid diluents such as alcohol, aqueous alcohol, isopropanol, dimethyl phthalate and hydrocarbon oils such as kerosene or emulsified in water, if necessary with the aid of a suitable dispersing agent. If desired they may be admixed with finely divided carriers such as diatomaceous earth, talc, pyrophylite, bentonite, etc.

Furthermore the new compounds of my invention may be combined with insecticidal materials such as pyrethrum, rotenone, derris, cubé, DDT and the like. Such a combination is particularly effective where the paralytic and lethal action of the insecticide is slow.

Although this invention has been described with reference to illustrative embodiments thereof it will be apparent to those skilled in the art that the principles of this invention may be embodied in other forms but within the scope of the appended claims.

What I claim is:

1. The N-substituted α-etherified acetamides having the general formula:

R—O—CH₂CO—NHR′ wherein R is aralykyl and R′ is an aliphatic hydrocarbon radical.

2. N-dodecyl benzoxyacetamide.
3. N-isobutyl phenethoxyacetamide.
4. N-amyl benzoxyacetamide.
5. An insect combative composition of matter comprising as essential active ingredient N-dodecyl benzoxyacetamide and a carrier therefor.
6. An insect combative composition of matter comprising as essential active ingredient N-isobutyl phenethoxyacetamide and a carrier therefor.
7. An insect combative composition of matter comprising as essential active ingredient N-amyl benzoxyacetamide and a carrier therefor.
8. An insect combative composition of matter comprising as essential active ingredient an N-substituted α-etherified acetamide having the general formula:

R—O—CH₂CO—NHR′ wherein R is aralkyl and R′ is an aliphatic hydrocarbon radical, dissolved in an aliphatic alcohol.

9. An insect combative composition of matter comprising as essential active ingredient an N-substituted α-etherified acetamide having the general formula:

R—O—CH₂CO—NHR′ wherein R is aralkyl and R′ is an aliphatic hydrocarbon radical, dissolved in a kerosene type hydrocarbon.

10. An insect combative composition of matter comprising as essential active ingredient an N-substituted α-etherified acetamide having the general formula:

R—O—CH₂CO—NHR′ wherein R is aralkyl and R′ is an aliphatic hydrocarbon radical, dissolved in aqueous alcohol.

11. An insect combative composition of matter comprising an N-substituted alpha-etherified acetamide having the general formula:

R—O—CH₂CO—NHR′ wherein R is aralkyl and R′ is an aliphatic hydrocarbon radical and a carrier therefor.

12. The N-substituted α-etherified acetamides having the general formula:

wherein R is aralkyl and R' is alkyl.

13. An insect combative composition of matter comprising an N-substituted alpha-etherified acetamide having the general formula:

wherein R is aralkyl and R' is alkyl, and a carrier therefor.

LOWELL B. KILGORE.

REFERENCES CITED

The following references are of record in the file of this patent:

UNITED STATES PATENTS

| Number | Name | Date |
|---|---|---|
| 543,214 | Majert | July 25, 1895 |
| 563,009 | Bischler | June 30, 1896 |
| 1,094,296 | Bergell | Apr. 21, 1914 |
| 2,120,512 | Rosenhauer | June 14, 1938 |
| 2,166,119 | Bousquet | July 18, 1939 |

FOREIGN PATENTS

| Number | Country | Date |
|---|---|---|
| 501,004 | Great Britain | Feb. 10, 1939 |
| 585,740 | Germany | Oct. 7, 1933 |

OTHER REFERENCES

Sidgwick, "Organic Chemistry of Nitrogen" (1937), pages 136–140. (Copy in Division 6).

Jour. Econ. Ent., August 1940, pages 609–672, by Bushland. (Copy in Division 63.)

C. A., vol. 6, page 1154 (1912), by Frankland et al.

C. A., vol. 28, page 134 (1934), by Fischer et al. (Copies in Patent Office Library.)

Jour. of Prak. Chem. (2) 65 (1902), pages 479 and 480. (Copy in 260–559.)